United States Patent

Finzel et al.

[11] Patent Number: 6,088,900
[45] Date of Patent: Jul. 18, 2000

[54] APPARATUS FOR CUTTING LIGHT WAVEGUIDE CABLES

[75] Inventors: Lothar Finzel, Unterschleissheim; Heinz Diermeier, Munich; Guenther Weber, Burgkirchen, all of Germany

[73] Assignee: Siemens Aktiengesellschaft, Munich, Germany

[21] Appl. No.: 09/078,608

[22] Filed: May 14, 1998

[30] Foreign Application Priority Data

May 16, 1997 [DE] Germany ............................ 197 20 598

[51] Int. Cl.⁷ ...................................................... B23P 19/02
[52] U.S. Cl. ..................... 29/426.4; 29/426.5; 29/403.4; 81/9.51; 409/180
[58] Field of Search ............................... 29/403.3, 403.4, 29/426.4, 426.5; 81/951; 65/403; 385/123, 126, 134, 137; 409/139, 140, 157, 175, 180

[56] References Cited

U.S. PATENT DOCUMENTS

| | | |
|---|---|---|
| 860,760 | 7/1907 | Muller . |
| 1,011,265 | 12/1911 | Summey . |
| 2,726,579 | 12/1955 | Martellotti . |
| 3,063,094 | 11/1962 | Warthen . |
| 3,443,305 | 5/1969 | Matsuda et al. . |
| 3,462,052 | 8/1969 | Wagner . |
| 3,545,336 | 12/1970 | Savko . |
| 3,577,813 | 5/1971 | Vorontsov . |
| 3,691,488 | 9/1972 | Holtum, Jr. . |
| 4,011,118 | 3/1977 | Geominy . |
| 4,179,189 | 12/1979 | Kaminow et al. . |
| 4,188,841 | 2/1980 | Nakamura et al. . |
| 4,199,854 | 4/1980 | Bitting et al. . |
| 4,279,067 | 7/1981 | Jenks . |
| 4,394,062 | 7/1983 | Schneider . |
| 4,534,254 | 8/1985 | Budzich et al. . |
| 4,676,594 | 6/1987 | Presby . |
| 4,699,027 | 10/1987 | Guyette et al. . |
| 4,827,676 | 5/1989 | Kindermann . |
| 4,859,223 | 8/1989 | Kajioka et al. . |
| 4,938,561 | 7/1990 | Grasso et al. . |
| 4,978,377 | 12/1990 | Brehm et al. . |
| 5,105,702 | 4/1992 | Fara . |
| 5,107,735 | 4/1992 | Ramun et al. . |
| 5,182,783 | 1/1993 | Bosc et al. . |
| 5,339,058 | 8/1994 | Lique . |
| 5,411,566 | 5/1995 | Poole et al. . |
| 5,542,327 | 8/1996 | Schultz . |
| 5,543,000 | 8/1996 | Lique . |
| 5,600,879 | 2/1997 | Tsuchimoto et al. . |

FOREIGN PATENT DOCUMENTS

| | | | |
|---|---|---|---|
| 2-110411 | 4/1990 | Japan | ...................................... 385/137 |
| 6-242323 | 9/1994 | Japan | ...................................... 385/134 |

*Primary Examiner*—Irene Cuda
*Attorney, Agent, or Firm*—Hill & Simpson

[57] ABSTRACT

A method for cutting an outer cladding or tube of a light waveguide cable to form a gap includes removing material on the opposite lateral portions of the outer cladding to produce flattened areas, forming an annular cut on each end of the flattened area and then splitting the cladding in the flattened areas to enable removal of the portion. To accomplish the production of the flattened areas, a milling unit having guide rollers for the cladding and a pair of milling wheels engaging opposite sides of a cladding of a cable held in the guide rollers is used.

14 Claims, 3 Drawing Sheets

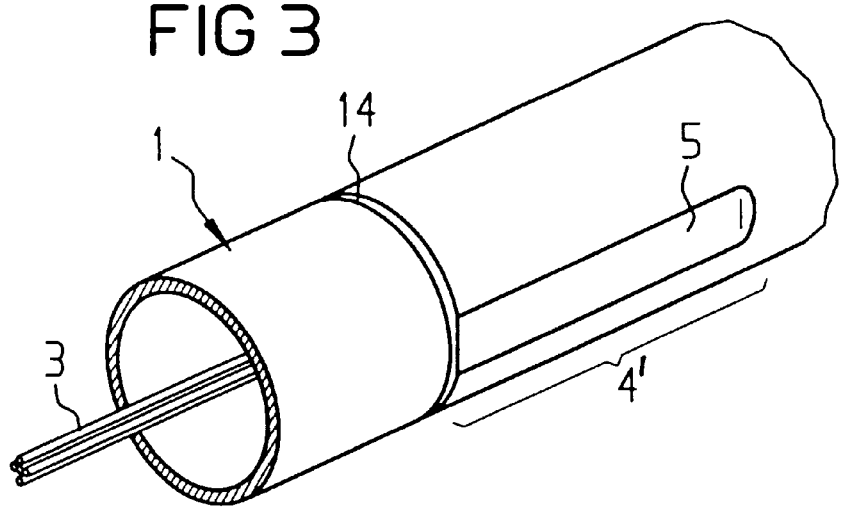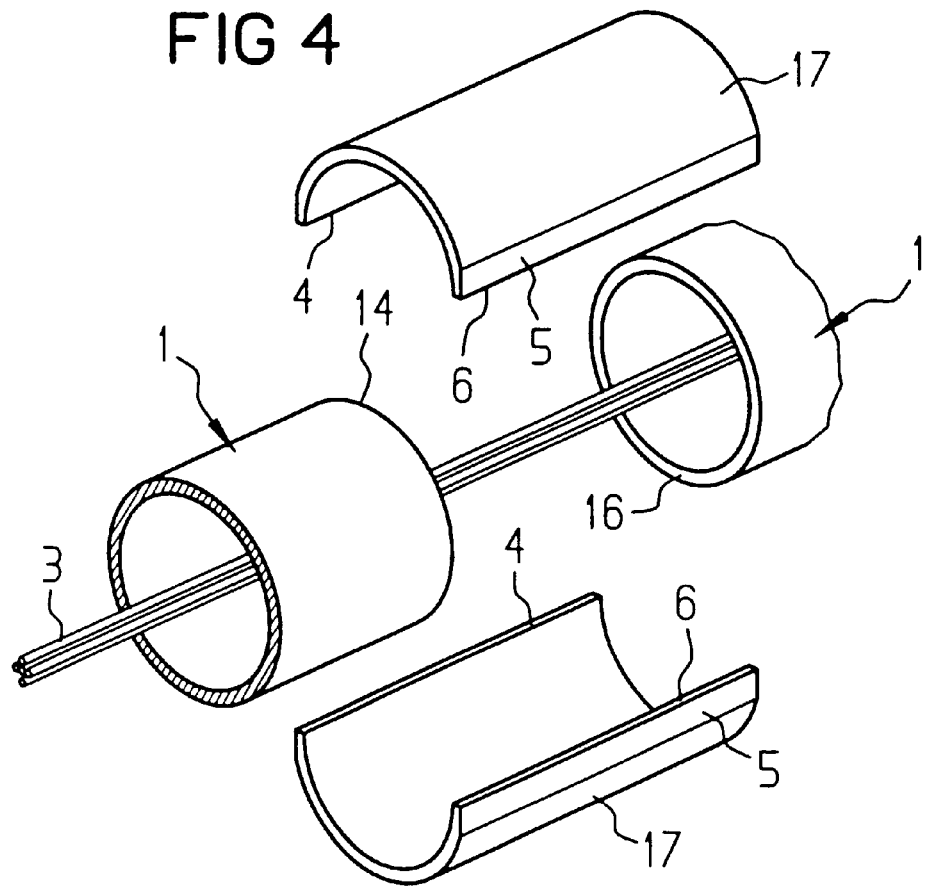

APPARATUS FOR CUTTING LIGHT WAVEGUIDE CABLES

BACKGROUND OF THE INVENTION

The present invention is directed to a method and an apparatus for cutting light waveguide cables with a tubular outer cladding.

In the cutting technique for light waveguide bundle leads, which comprise, for example, a plastic or synthetic cladding, the exposure of the light waveguide leads can occur with a simple cutting tool. The cable cladding is sliced along a cladding line and then removed for a corresponding length. However, in cable cladding having a metal tube, which is used in a microcable, this cutting technique is not possible, because these microcables consist of mostly metal tubes in which the light waveguides are accommodated in a loose fashion.

SUMMARY OF THE INVENTION

An object of the present invention is to provide a method in which the cable cladding of metal, particular metal tubes of microcables, can be detached and removed at a prescribed length from a piece of cable in what is known as a cutting technique. This object is achieved with a method in which the tubular outer cladding of the light waveguide cable has material removed along two opposite cladding lines to form flattened portions and then an annular incision or cut is constructed at least at one end of the resulting flattened portions so that the tubular outer cladding can be separated and removed along these flattened areas.

Another object of the invention is to provide an apparatus for removing the material to form the flattened thin web portions, which apparatus comprises a milling unit, guide rollers for guiding the cladding while milling opposite sides of the cladding to form the flattened portions.

An advantageous result of the method is that the cutting technique can be used even with bundle leads or, respectively, light waveguide cables with metal tubes, for example microcables or cladding-only cables. The outer metal tube of the microcable is then stripped or removed along two opposite lines to form two flattened areas and then the tube can be subsequently separated or, respectively sliced in this region in a simple fashion and removed after forming at least one annular incision at the end of the flattened areas. The annular incision or cuts are preferably constructed at both ends. In this way, the intermediate region of the microcable is exposed to such an extent that the light waveguide leads, which are loose in the cladding, are now accessible. The material strippings, which form flattened portions on the tube of the light waveguide cables, are produced by milling, wherein both of the opposing cladding regions are appropriately simultaneously processed. In this method, the light waveguide cable is, thus, first led in a device between guide rollers and then successively pushed into a milling unit acting on both sides. This unit consists of at least two opposed milling wheels or cutters. The intervals between the guide rollers as well as between the milling cutters can be adjusted to the diameter of the employed cable type and potentially also controlled, so that tolerances can be balanced out. In this step, the tube is stripped to such an extent that narrow webs still remain, preferably with a thickness in the order of magnitude of 0.1 mm. This is necessary in order to assure that the light waveguide leads that are inside the cable are not damaged by the removal of the material. In another step, an annular incision is introduced in the tube at least at one end of the resulting flattened regions in order to separate the region which is to be exposed from the rest of the cable. In another step, the resulting thin webs are then split along a respective cladding line and the outer cladding, which is now split longitudinally, is removed. The individual functioning parts of the device which are used in this method can consist of component parts which are used in succession. However, the guide unit, the milling unit, the annular cutter and removal devices can also be put together into a single structural unit. The control unit and regulating unit for driving the guide rollers and the milling wheels or cutters can then also be integrated in this structural unit.

Other advantages and features of the invention will be readily apparent from the following description of the preferred embodiments, the drawings and claims.

BRIEF DESCRIPTION OF THE DRAWINGS

FIG. 3 is a perspective view of a microcable after construction of the first annular incision;

FIG. 4 is a perspective view of a microcable after the completed cutting process to remove portions to obtain access to the fibers;

DESCRIPTION OF THE PREFERRED EMBODIMENTS

Figure 1:
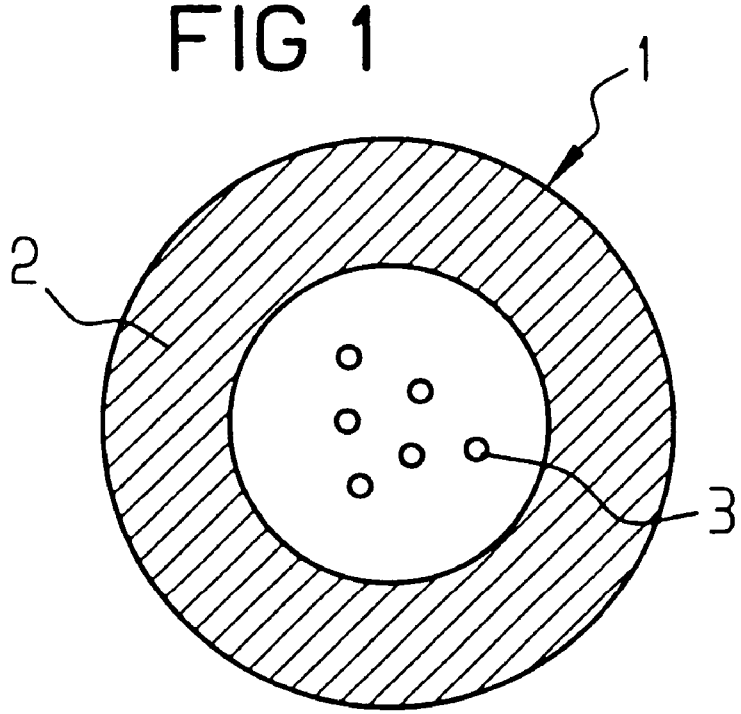
FIG. 1 is a cross-sectional view of a light waveguide cable constructed as a microcable.

The principles of the present invention are particularly useful for obtaining access to the interior of a microcable, generally indicated in FIG. 1. The microcable of FIG. 1 is a light waveguide cable which consists of a tube 2 of metal, which surrounds light waveguide leads or fibers 3, which are loosely received inside the tube 2. If a branching or junction or a cable sleeve is to be set up for such a microcable, then the microcable must be cut, which means that the tube 2 must be opened so that the light waveguide leads located inside are accessible. Care must be taken that the sensitive light waveguide leads 3 are not damaged during the opening of the tube 2. The exposed light waveguide leads 3 are then spliced with other light waveguide leads in the branching or junction and are laid down or, respectively, lead through uncut in a cable sleeve in the lead-throughs or continuations. The unprotected light waveguide leads are therein surrounded over the entire length of the gap by a longitudinally slit hose, which is clamped onto the tube a clamping device, such as a helical spring clamping arrangement, so that the light waveguides are protected from buckling with impermissible bends.

Figure 2:
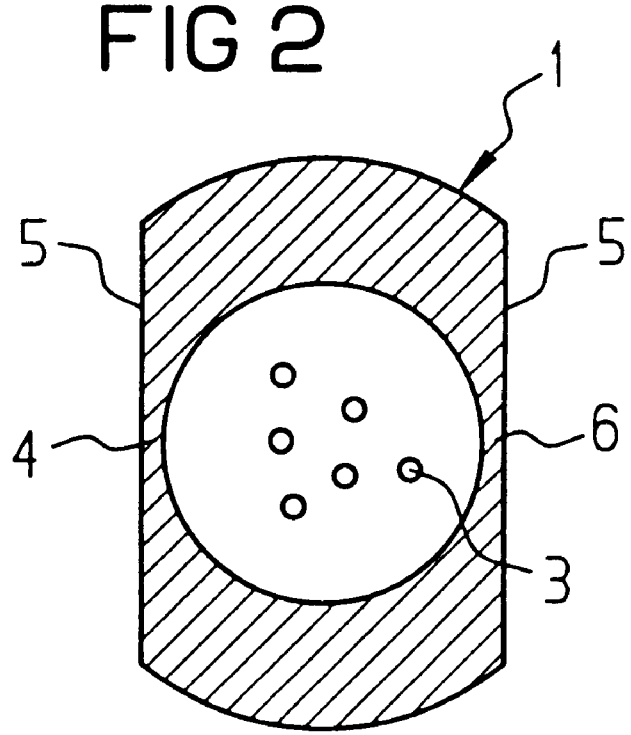
FIG. 2 is a cross-sectional view of the microcable of FIG. 1 after removal of material to produce lateral flattened areas.

In accordance with the present invention, a cutting of the light waveguide microcable 1 is done by producing flattened portions 5 on opposite sides of the tube 2, as shown in FIG. 2, by stripping the material away, such as by milling. In fact, the material is removed to such an extent that only an extremely small wall or, respectively, thin webs 4 and 6 remain in order to minimize the danger of damaging the light waveguide leads 3, which are inside of the tube 2. Given a wall thickness of the tube 2 of 1 mm to 2 mm, the residual wall thicknesses at the webs 4 and 6 should be smaller than 0.1 mm. On one hand, the webs 4 and 6 should still offer protection and, on the other hand, however, their slicing into two half-tubes and their removal should be possible with a simple extraction device, according to the length of the webs.

Figure 5:
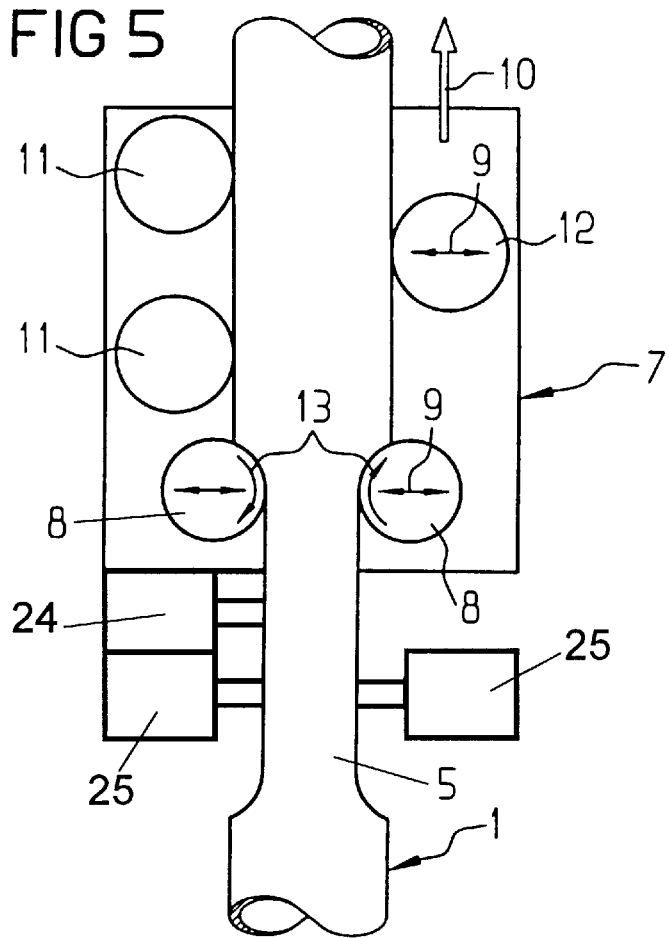
FIG. 5 is a plan view of an apparatus for producing the lateral milled portions on the cladding.

As shown in FIG. 3, the next step following the production of the lateral flattenings 5 is to produce an annular incision or cut 14, which extends completely around the circumference of the tube 2 and can be produced with a ring or annular tube cutter 24 (see FIG. 5). It is preferably produced at the end of the flattened region 5, which has a length 4'. Thus, a ring-shaped severing through the tube will occur. It is advantageous that the microcable 1 with the tube 2 is held in a holder on both sides of the cuts prior to the severing by the annular cut 14. Thus, the fibers are protected from impermissible bending if the tubes on both ends of the flattened region are being held.

As shown in FIG. 4, the next step is a second ring incision or annular cut 16 that is spaced at the other end of the flattened webs 4 and 6 and the webs 4 and 6 have longitudinal cuts so that two half-tubes 17 are produced and can be lifted out from the microcable 1 to form a gap which provides access to the leads 3. It is appropriate to begin the severing first along one web starting from an annular incision 16. The uncut light waveguides 3 located therein are thus accessible and can be brought into a cable sleeve, for example, branched there or led therethrough.

An apparatus, generally indicated at 7 in FIG. 5, is the simplest form for forming the flattened portions 5 on the tube 2 of the microcable 1. The apparatus includes guide rollers 11 and 12, which are arranged with the two rollers 11 on one side and the second roller 12 on the opposite side. The roller 12, as illustrated, is mounted to be adjustable in a controlled fashion in a direction of the double-arrow 9 so as to compensate for changes in the size or diameter of the tube 2 of the microcable 1. This adjustment also allows for compensating for tolerance in the diameter due to movement of the cable. To produce the flattenings, two opposed milling wheels or cutting rollers 8 are arranged in a milling unit, whose rollers have an interval which can be adjusted in the direction indicated by the double-arrow 9, in correspondence with the requirement removal of the material. The arrow 13 indicates the direction of rotation of each of the milling wheels 8 for production of the flattened portions 5 on the microcable 1. Thus, both wheels rotate in the same direction but cut the tube in opposite directions. The illustration is based on the assumption that the device 7 is pulled along the microcable 1 in the direction of the arrow 10. It is also possible, however, to hold the device or apparatus 7 in place and to pull the microcable 1 through the guide channels between the guide rollers and the milling wheels in a direction opposite to the arrow 10 so that relative movement is in the direction of the arrow 10.

Figure 6:
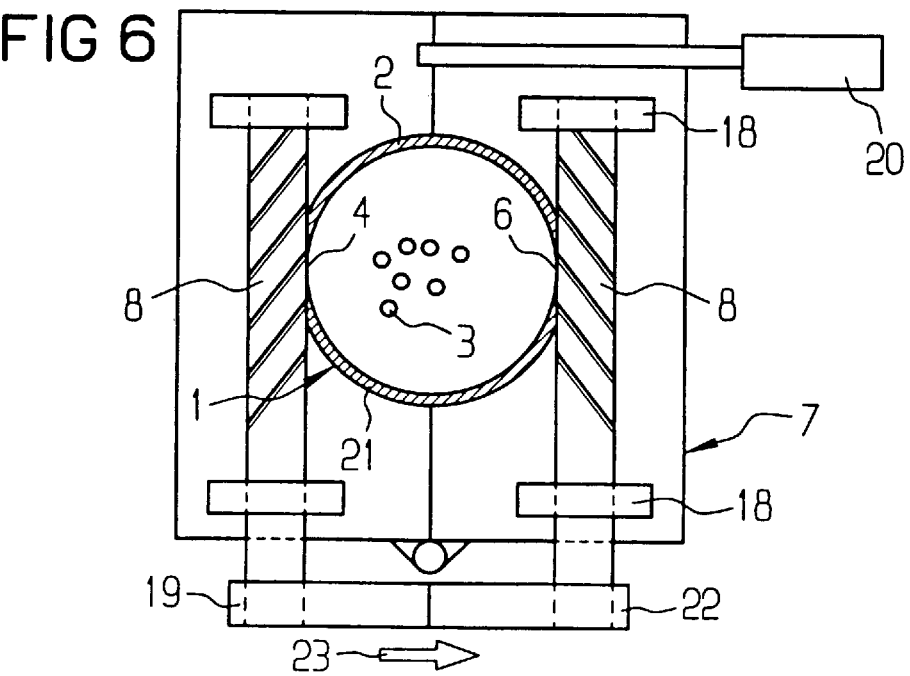
FIG. 6 is an end view of the device of FIG. 5 showing regulating means.

The device 7 can be provided with regulating units, as illustrated in FIG. 6. For example, the microcable 1 consisting of the tube 2 and the light waveguide leads 3 is led in a guide channel 21 of the device 7 perpendicular to the direction of the drawing. The stripping or removal of material has already been conducted by the milling wheels 8, which are mounted on supports 18 on both sides, so that the flattened portion 5 have already occurred. In addition, the two milling wheels 8 are driven by a controllable drive unit 19. A justifying device 20 is indicated, through which the microcable 1 is correspondingly guided and controlled in the guide channel 21, which is between the guide rollers, which are not illustrated in this Figure. A plurality of milling units 8 or guide units can also be arranged one behind the other or, respectively, successively in the device if a more exact guidance and removal of material in a plurality of layers is desired.

It is advantageous if the interval of the opposing milling wheels 8 is adjusted according to the interval of the opposite guide rollers 11, independently according to the respective diameter of the tube 2. In the device, the milling wheels 8 and the guide rollers 11 on one side can be assembled on a drive unit 19, which is pressed in a biased manner against a drive unit 22 with a milling wheel and the guide roller 12 on the opposite side. In this way, tolerances and thickness fluctuations of the tube 2 can be compensated.

FIG. 5 shows splitting or severing devices 25 for making the longitudinal cuts in the flattened regions 5 along a respective cladding line, with which device the tube 2 is split in the flattened regions into two half-tubes 17, as illustrated in FIG. 4. However, such a cutting device can be a conventional cutter. It is also possible to use conventional tools for cutting each of the half-tubes or bending them and removing them from the microcable adjacent each of the annular cuts, such as 14. Preferably, the apparatus 7 is constructed so that it can be pulled or moved along arbitrarily-shaped microcables without the remaining webs 4 and 6 with a residual thickness of 0.1 mm being compromised.

Although various minor modifications may be suggested by those versed in the art, it should be understood that we wish to embody within the scope of the patent granted hereon all such modifications as reasonably and properly come within the scope of our contribution to the art.

We claim:

1. A method for cutting light waveguide cables with a tubular cladding, said method comprising the steps of removing material along the cladding to form thin webs opposite one another, forming an annular incision at least at one end of the webs, and then splitting the tubular outer cladding in the area of the webs so that it can be removed.

2. A method according to claim 1, wherein each of the webs is produced by milling the tube.

3. A method according to claim 2, wherein the two opposed webs are produced by simultaneously milling opposite sides of the outer cladding.

4. A method according to claim 1, wherein the step of removing a portion of the cladding to provide the webs is accomplished by moving the tube relative to a milling unit.

5. A method according to claim 1, wherein the method of removing the material to form the opposite webs is accomplished by moving the tube of the cable through a milling unit.

6. A device for forming flattened opposite webs on the outer cladding formed by a tube of a light waveguide cable, said apparatus comprising a milling unit, guide rollers positioned on opposite sides at an interval which is matched to the outer diameter of the tube of the light waveguide cable to form a guide channel for receiving the light waveguide cable, a pair of milling wheels being arranged on opposite sides of the tube for milling the outside tube to form the webs on the tube as the tube is received in the guide channel, an annular cutter to form at least one cut in the tube of the waveguide cable and a severing device for splitting each thin web to create half-tubes of the tube adjacent the annular cut.

7. A device according to claim 6, wherein the interval between the opposing guide rollers and the opposing milling wheels is adjustable.

8. A device according to claim 6, wherein the interval between the opposing milling wheels is adjustable independent of the adjustment of the distance between the guide wheels.

9. A device according to claim 6, wherein a plurality of pairs of guide rollers are arranged to form the guide channel.

10. A device according to claim 6, wherein a plurality of pairs of milling wheels are arranged for milling.

11. A device according to claim 6, wherein the milling wheels and guide rollers on one side are assembled on a first drive unit in a fixed manner and the milling wheels and guide rollers on the opposite side are fixed in a second drive unit which is biased toward the first drive unit.

12. A device according to claim 6, wherein the spacing between the milling wheels is adjusted so that subsequent to milling of the tube of the light waveguide cable, a residual thickness of the remaining webs in the flattened area is less than 0.1 mm.

13. A device according to claim 6, wherein means are provided for adjusting the distance between the milling wheels so as to maintain a web thickness of approximately 0.1 mm to compensate for bent and deformed microcables.

14. A device according to claim 6, wherein each of the milling wheels rotates in the same direction so that the cutting of one milling wheel is opposite to the cutting direction of the other milling wheel.

\* \* \* \* \*